April 1, 1952    S. C. MOON    2,591,584
WHEEL SUSPENSION AND STEERING ASSEMBLY
Filed June 13, 1947    3 Sheets-Sheet 1
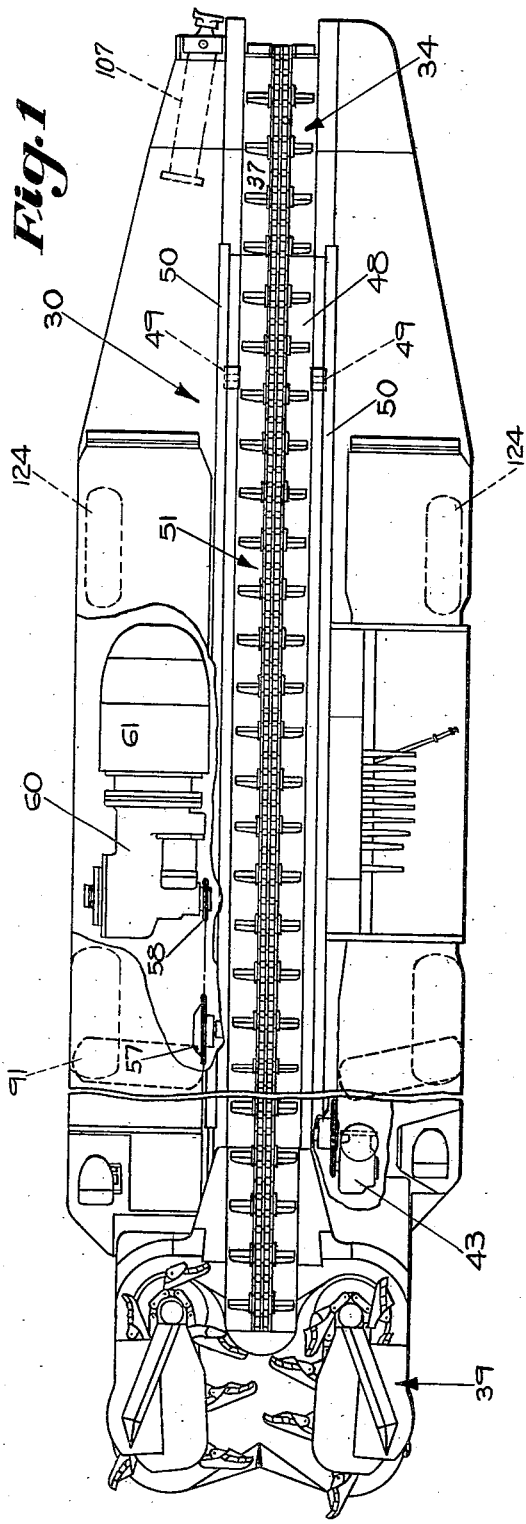
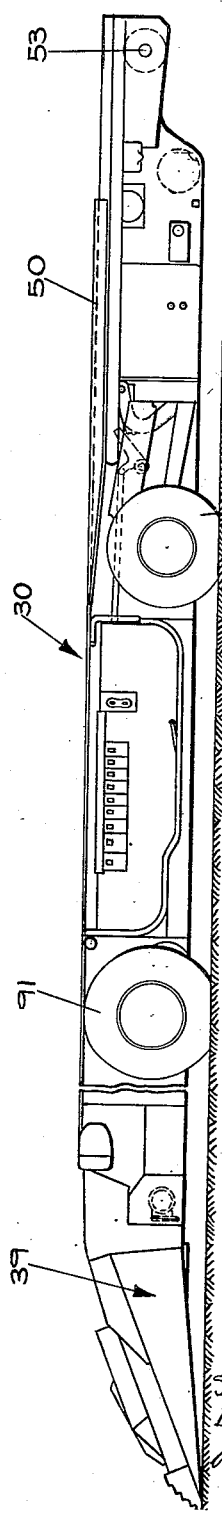
INVENTOR;
STERLING C. MOON,
By
ATTY.

April 1, 1952     S. C. MOON     2,591,584
WHEEL SUSPENSION AND STEERING ASSEMBLY
Filed June 13, 1947     3 Sheets-Sheet 2

INVENTOR
STERLING C. MOON,
By
ATTY.

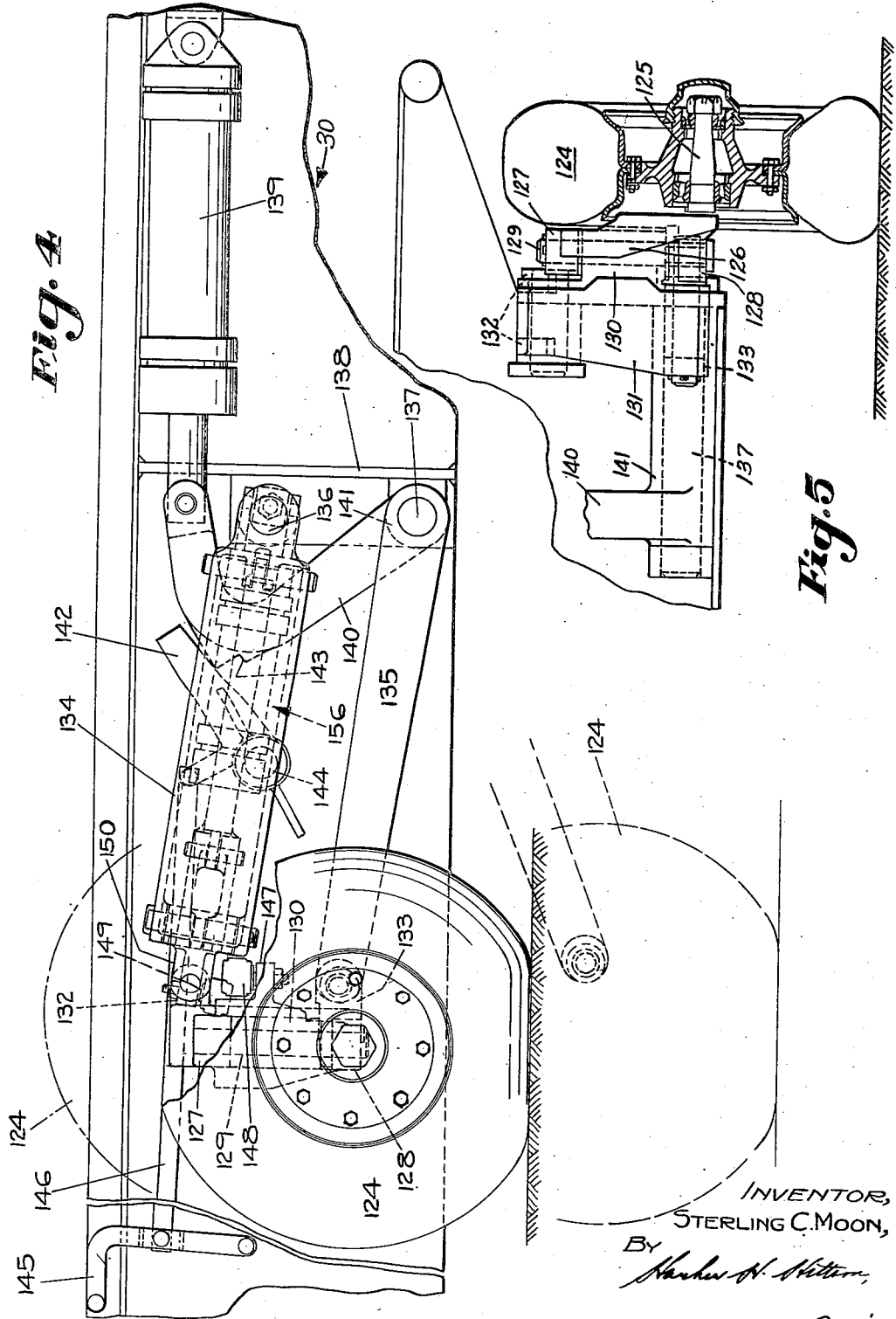

Patented Apr. 1, 1952

2,591,584

UNITED STATES PATENT OFFICE 2,591,584

WHEEL SUSPENSION AND STEERING ASSEMBLY

Sterling C. Moon, Worthington, Ohio, assignor to The Jeffrey Manufacturing Company, a corporation of Ohio Application June 13, 1947, Serial No. 754,516

4 Claims. (Cl. 280—95)

This invention relates to a loading machine adapted particularly for underground operation, for example, in a coal mine, to gather coal which has been previously undercut and shot or otherwise loosened and deliver the same to a receptacle, such as a conveyer.

An object of the invention therefore is to provide improved apparatus of the above mentioned type.

Another object of the invention is to provide an improved rear steering wheel assembly which can steer the vehicle while providing for vertical adjustment thereof.

Other objects of the invention will appear hereinafter, the novel features and combinations being set forth in the appended claims.

In the accompanying drawings,

Fig. 1 is a plan view of a machine incorporating my invention, with certain parts broken away;

Fig. 2 is a side elevational view of the machine;

Fig. 4 is a side elevational view showing particularly the vertical adjusting mechanism for the rear steering wheels; and Fig. 5 is a front elevational view of one of the rear steering wheel assemblies, with the wheel shown in section, and with parts omitted.

Figure 3:
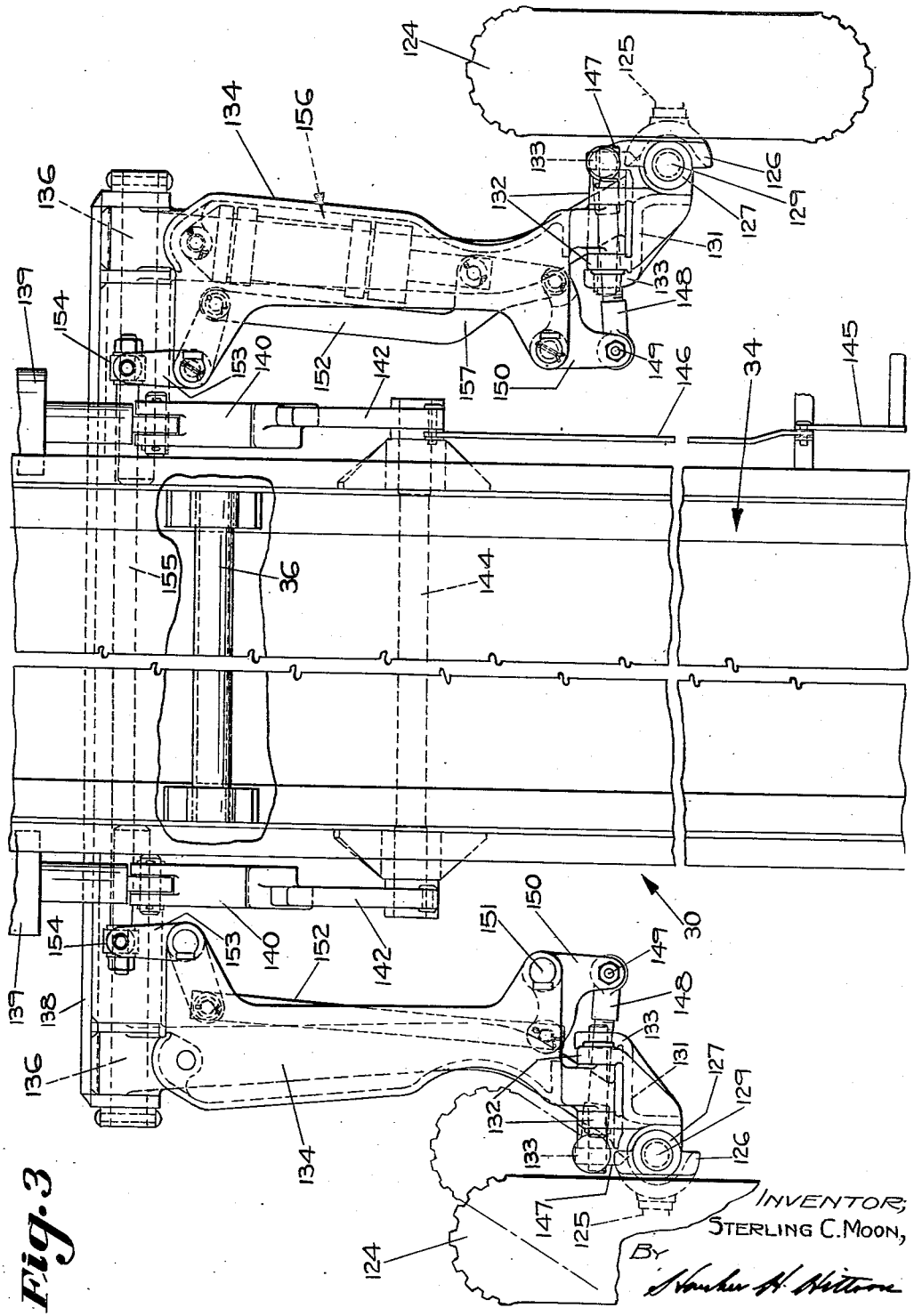
Fig. 3 is an enlarged plan view showing particularly the rear steering wheel assemblies of the machine, with parts of the loader omitted and with parts broken away.

The loading machine herein disclosed and claimed involves certain improvements on the machine disclosed in application Serial No. 530,361, of Arthur L. Lee, entitled Loading Machine, filed April 10, 1944. The machine includes an elongated generally horizontally extending low box-like main frame 30 which is built up of a number of welded or otherwise rigidly attached parts.

As clearly illustrated in Fig. 1 of the drawings, the top of the box-like main frame 30 is open and provides a rectilinear longitudinally extending trough 34 which is formed by a pair of opposite inwardly and downwardly sloping trough side walls.

At spaced intervals along the length of the main frame 30 there are cross-pieces in the form of tubes, or the like, which extend between and are rigidly connected to vertical bottom portions of the trough side walls. One of these tubes is seen at 36 in Fig. 3 of the drawings. These cross tubes not only connect the intermediate portion of the main frame side members together, but they also act to support a removable bottom pan 37 of the trough 34, which bottom pan 37 is of inverted channel shape and has its side upright webs or walls in close frictional engagement with the vertical portions of the trough side walls. The inverted channel or pan 37 may be readily removed by simply lifting it vertically out of the trough when the hereinafter described boom and associated traveling pan are removed, thus providing for inspection of those parts carried on the interior of the main frame 30. Furthermore, said bottom pan 37 provides a housing for at least part of the return run of the endless chain and flight conveyer mechanism hereinafter described more completely.

Telescoping within the bottom portion of the main frame 30 is a rectilinearly adjustable boom which extends out the front end of said main frame 30 and carries a gathering head 39 which is preferably adjustably mounted on said boom and may be adjusted by hydraulic mechanism about a transverse horizontal axis.

Power driven chain mechanism is provided for adjusting the boom rectilinearly relative to the main frame 30, and a portion of this power driven mechanism is seen at 43 in Fig. 1 of the drawings.

An overlapping trough 48 rides in and overlaps the main frame trough 34 and is pivotally attached to the gathering head 39 so that material, such as loose coal, gathered by said gathering head 39 will always be delivered to the traveling trough 48 for all positions thereof.

As illustrated in Fig. 1 of the drawings, the overlapping trough 48 is quite long and extends near the rear of the main frame trough 34 when the head is retracted. To maintain the rear discharge edge of the trough 48 in sliding contact with the trough 34 at all times, the sloping side walls of said trough 48 are cut to give flexibility thereto along a transverse axis, this flexible construction being generally illustrated at 49 in Fig. 1 of the drawings. The details of this construction are disclosed and claimed in the application of Arthur L. Lee for an underground loading machine including a flexible trough, Serial No. 81,794, filed March 16, 1949.

The general configuration of the trough 48 follows the configuration of the trough 34 so that it fits readily thereinto. To maintain a close overlap between the sliding trough 48 and the stationary trough 34 under the influence of the head 39 and boom, longitudinally extending overlapping angles 50 are provided along each top edge of the main frame 30 and extend substantially the full length thereof, thereby removably holding the longitudinally slidable trough 48 down against the walls of the stationary trough 34.

An endless double chain and flight conveyer 51 extends from a head shaft in the gathering head 39 to a discharge or tail shaft adjacent the rear or discharge end of the main frame 30, the upper or working run thereof running continuously from the front end to the rear end of the troughs 34 and 48, the return run being reeved about shafts which provide for the free expansion of the boom in a manner disclosed in full detail in said Lee application, Serial No. 530,361.

It is adequate for the purposes of this application to point out that the double chain of said conveyer 51 is driven by a pair of sprockets on a cross shaft which is mounted at its opposite ends in spaced self-aligning bearings and which is driven by sprocket 57 (see Fig. 1) which in turn is driven by a chain from a sprocket 58 controlled by a clutch mounted in a housing 60 to which a primary electric driving motor 61 is attached, the housing 60 and motor 61 being rigidly attached to the one side of the main frame 30.

As seen in Fig. 1 of the drawings, the gathering head 39 includes a pair of laterally spaced gathering conveyers, including endless chains and pivot flights, which are power driven to gather the material and convey it rearwardly and upwardly and discharge it into the receiving or front end of the trough 48.

The front end of the main frame 30 is supported by a pair of power driven traction wheels 91, spaced one at each side of the main frame 30 that may be driven to propel the machine forwardly and rearwardly and which may be swung to a tandem position as indicated in dotted lines in Fig. 1 of the drawings, wherein they may be driven to swing the front end of the machine laterally or from side to side. Wheels 91 are mounted for vertical movement and are so moved by hydraulic motors, not shown, to raise and lower the front end of the machine, with respect to the mine floor. One apparatus for mounting the wheels, driving, swinging and elevating them as described is shown in said Lee application, Serial No. 530,361. When the wheels 91 are in their tandem position, they may be employed to swing the machine about the axis of an anchoring jack 107 (see Fig. 1) when the latter is swung to an upright position and expanded between the mine floor and roof.

The rear end of the machine is provided with a pair of vertically adjustable spaced steering wheels 124 that may be elevated from the mine floor when the machine is supported by anchoring jack 107, and attention is now directed particularly to Figs. 3, 4, and 5 of the drawings and to the structure of the improved mechanism which I have provided for steering and vertically adjusting the rear wheels of the loader. As illustrated in Figs. 1 and 2 of the drawings, there is a pair of rear steering wheels 124 adjacent the rear of the vehicle, said wheels being in transverse alignment, one on each side of the main frame 30. These wheels are part of wheel assemblies which provide for steering of the self-contained loading machine and also provide for their vertical adjustment relative to the main frame 30 which is effective to adjust the height of the discharge end and it may be employed for various purposes. It may be mentioned that during operation of the machine, after the jack 107 is anchored, the wheels 124 are lifted off the ground so that the rear end of the loader is supported by the anchoring jack 107, the front being supported by the wheels 91 which are shifted to their tandem positions. The lifting of the wheels 124 off the mine floor is, of course, necessary to provide for the swinging of the machine as a unit about the upright axes of the jack 107 which, of course, is effected by feeding the generally tandem positioned wheels 91.

The wheel assemblies of the steering wheels 124 on opposite sides are substantially the same, except for the fact that one of them is provided with a double acting hydraulic steering jack. Because of their similarities the same reference characters will be employed in describing similar or identical parts. Each wheel 124 is journaled for rotation on a horizontal axis by a spindle 125 carried by a bracket or casting 126 which is bifurcated and provided with a top cylindrical journal bearing portion 127 and a bottom cylindrical journal bearing portion 128. A substantially upright king pin 129 extends between and is received by the upper and lower bearing portions 127 and 128. Said king pin 129 also extends through a substantially cylindrical portion of bracket or casting 130 (see Fig. 5), which cylindrical portion extends between and is in alignment with the two cylindrical portions 127 and 128 of bracket 126. Thus the king pin 129 mounts the wheel supporting bracket 126 on the bracket 130 for steering adjustment or movement about a substantially upright axis.

Formed as a rigid or integral part of the casting 130 is an upstanding angle plate 131 (see Figs. 3 and 5) which has top and bottom forwardly extending reinforcing flanges and top and bottom aligned and spaced eyes 132 and 133, respectively, which receive pivot pins for pivotally mounting the forward ends of top and bottom arms 134 and 135, respectively, of a parallel motion mechanism, the rear ends of said arms 134 and 135 being pivotally connected to the main frame 30 on spaced transverse horizontal axes by pivot pins 136 and 137 carried by an upstanding cross plate 138 attached to and forming a part of the main frame 30, as clearly illustrated in Figs. 3 and 4 of the drawings.

As best illustrated in Fig. 4 of the drawings, the axes of the pins 136 and 137 lie in a transverse upright plane. The distance between the pivotal axes 136 and 137 is preferably substantially the same as the distance between the parallel axes of the pivotal connections between the front ends of the arms 134 and 135 and the bracket 130, 131. As a consequence, a parallel motion mechanism is provided and as the arms 134, 135 swing upwardly and downwardly with respect to the main frame 30 about the axes of pin 136, 137, the king pin 129 will be maintained substantially upright for all up and down positions of adjustment thereof. This is important in connection with maintaining the proper steering of said wheels 124 for the various up and down positions of adjustment thereof.

To adjust the wheels 124 upwardly and downwardly, while maintaining the axes of the king pins 129 substantially upright, each of said wheel assemblies is provided with an individual double acting hydraulic piston motor 139, the cylinder of which is pivotally attached at its rear end to the main frame 30 and the piston of which is attached to the top of an L-shaped crank arm 140 formed integral with a cylindrical sleeve 141 (see Fig. 5), which sleeve in turn is formed integral with the lower arm 135.

The two hydraulic piston motors 139 are connected in parallel, thus providing hydraulic differential action between them. By controlling the flow of hydraulic fluid to them it is obvious that the wheels 124 may be raised and lowered under power. The hydraulic system is such that they may be locked in any adjusted position. In addition, it is provided with a mechanical latch 142 adapted to cooperate with notch 143 formed in each arm 140 to hold the wheels 124 substantially in their highest positions. The two latches 142 are rigidly connected to a common cross shaft 144 (see Fig. 3) which is supported in spaced bearings in the side members of the main frame 30 so that both latches 142 operate together, they being controlled by a single operating lever 145 and control rod 146.

The steering mechanism for the two wheels 124 which I have provided has been found very effective to give a rigid control of the two wheels while in no wise interfering with extensive vertical adjustment of said wheels by the mechanism above described. This steering mechanism is effected by apparatus now to be described.

Extending rearwardly and substantially at right angles to the axis of the spindle 125 the upper cylindrical portion 127 of casting 126 carries an integral arm 147. A laterally extending drag link 148 is connected to the arm 147 by a ball and socket joint. The inner end of the drag link 148 is pivotally attached to a bell crank lever 150 by a ball and socket connection 149, the bell crank lever 150 being pivotally mounted on a generally upright axis to the upper arm 134 by a pivot pin 151.

The bell crank lever 150 has an outwardly extending arm which is pivotally attached to a substantially longitudinally extending operating rod 152 which is pivotally connected to a bell crank lever 153 pivoted by a pin to the rear end of arm 134. Bell crank lever 153 has a rearwardly extending arm portion which is substantially parallel with the plane of the wheel 124 and which is pivotally connected to a trunnion ring 154, the pivotal connection being about a substantially upright axis. The two trunnion rings 154 of the two steering mechanisms for wheels 124 are connected together by a cross shaft 155. The trunnion rings 154 are preferably pivotally connected to the shaft 155 between spaced washers so that each wheel mechanism is free to rotate about said shaft 155. This allows equalizing movement of the two wheels 124.

It is to be noted that the axis of shaft 155 is parallel with the transverse upright plane which passes through the axes of the pivot pins 136 and 137 for the two parallel motion mechanisms of the two wheel assemblies and is positioned so that it is either within said plane or closely adjacent to it, as said shaft 155 swings in response to swinging movement of the bell cranks 153 to effect steering of the wheels 124. This axis of shaft 155 preferably swings equally to opposite sides of said upright plane as the wheels 124 swing from one extreme position to the other.

To effect steering of the two wheels 124 in unison, the right-hand assembly, as viewed in Fig. 3, includes a double acting hydraulic piston motor 156, the cylinder of which is pivoted to the rear end of the right-hand arm 134, and the piston rod of which is pivotally connected to a plate 157 (see Fig. 3) which is welded to the right-hand operating rod 152 and in effect forms a part thereof.

It is obvious from the above description that the two wheels 124 are mechanically connected together so that they are steered simultaneously. The interconnecting linkage mechanisms are compensating in character as is desirable for dirigible or steering wheels. Of significance in this particular is the fact that the axis of each drag link 148 is substantially parallel with the axis of the pivotal connection between the upper arm 134 and the casing 130, 131, though obviously exact parallelism can not be maintained between these axes because as the wheels 124 are swung the axes of the drag links 148 also swing.

In general, the mode of operation of the loading machine is generally the same as that disclosed in the Lee application, Serial No. 530,361 and consequently will not be described here.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A machine including a main frame, a pair of spaced steering and supporting wheel assemblies, each of said assemblies including a wheel, a spindle for said wheel, a king pin and bracket means mounting said spindle for pivotal adjustment on an upright axis, parallel motion mechanism interconnecting said king pin and bracket means and said main frame and mounting said king pin and bracket means, the spindle and wheel for upward and downward adjustment relative to said main frame while maintaining the axis of the king pin upright for all positions of adjustment, power operated means for adjusting said wheel as aforesaid, steering mechanism for each said wheel assembly including linkage mechanism extending from each spindle and substantially parallel with said parallel motion mechanism and carried in part thereby and having a pivoted lever near the position of connection of said parallel motion mechanism to said main frame and carried by said parallel motion mechanism, and a tie rod interconnecting said lever of each wheel assembly thereby connecting the steering mechanisms of said two assemblies together, said tie rod being loosely connected to each steering mechanism to provide for independent raising and lowering of each wheel assembly.

2. A machine including a main frame, a pair of spaced steering and supporting wheel assemblies, each of said assemblies including a wheel, a spindle for said wheel, a king pin and bracket means mounting said spindle for pivotal adjustment on an upright axis, parallel motion mechanism interconnecting said king pin and bracket means and said main frame and mounting said king pin and bracket means, the spindle and wheel for upward and downward adjustment relative to said main frame while maintaining the axis of the king pin upright for all positions of adjustment, means for adjusting said wheel as aforesaid, steering mechanism for each said wheel assembly including linkage mechanism extending from each spindle and substantially parallel with said parallel motion mechanism and carried in part thereby and having a pivoted lever near the position of connection of said parallel motion mechanism to said main frame and carried by said parallel motion mechanism, and a tie rod interconnecting said lever of each wheel assembly thereby connecting the steering mechanisms of said two assemblies together, said tie rod extending near a plane passing through the pivotal axes of connection of said parallel motion mechanisms to said main frame, said tie rod being loosely connected to each steering mechanism to provide for independent raising and lowering of each wheel assembly.

3. A machine including a main frame, a pair of spaced steering and supporting wheel assemblies, each of said assemblies including a wheel, a spindle for said wheel, king pin and bracket means mounting said spindle for pivotal adjustment on an upright axis, parallel motion mechanism interconnecting said king pin and bracket means and said main frame and mounting said king pin and bracket means, the spindle and wheel for upward and downward adjustment relative to said main frame while maintaining the axis of the king pin upright for all positions of adjustment, means for adjusting said wheel as aforesaid, steering mechanism for said wheel including an arm rigidly connected to said spindle and extending substantially at a right angle relative thereto and at a right angle to said axis of said king pin, a bell crank lever pivotally connected to an arm of said parallel motion mechanism adjacent the king pin and bracket means, a drag link interconnecting one end of said bell crank lever and said first named arm and having its axis generally parallel with and in the plane of the transverse axis of the pivotal connection between the parallel motion mechanism and said king pin and bracket means, an operating rod extending along said parallel motion mechanism connected to the other end of said bell crank lever and a second bell crank lever pivotally connected to an arm of said parallel motion mechanism adjacent its connection to said main frame, and a tie rod interconnecting said second bell crank lever of each wheel assembly thereby connecting the steering mechanisms of said two assemblies together, said tie rod extending near a plane passing through the pivotal axes of connection of said parallel motion mechanisms to said main frame, said tie rod being loosely connected to each steering mechanism to provide for independent raising and lowering of each wheel assembly.

4. A machine including a main frame, a pair of spaced steering and supporting wheel assemblies, each of said assemblies including a wheel, a spindle for said wheel, king pin and bracket means mounting said spindle for pivotal adjustment on an upright axis, parallel motion mechanism interconnecting said king pin and bracket means and said main frame and mounting said king pin and bracket means, the spindle and wheel for upward and downward adjustment relative to said main frame while maintaining the axis of the king pin upright for all positions of adjustment, means for adjusting said wheel as aforesaid, steering mechanism for said wheel including an arm rigidly connected to said spindle and extending substantially at a right angle relative thereto and at a right angle to said axis of said king pin, a bell crank lever pivotally connected to an arm of said parallel motion mechanism adjacent the king pin and bracket means, a drag link interconnecting one end of said bell crank lever and said first named arm and having its axis generally parallel with and in the plane of the transverse axis of the pivotal connection between the parallel motion mechanism and said king pin and bracket means, an operating rod extending along said parallel motion mechanism connected to the other end of said bell crank lever and a second bell crank lever pivotally connected to an arm of said parallel motion mechanism adjacent its connection to said main frame, and a tie rod interconnecting said second bell crank lever of each wheel assembly thereby connecting the steering mechanisms of said two assemblies together, said tie rod extending near a plane passing through the pivotal axes of connection of said parallel motion mechanisms to said main frame.

STERLING C. MOON.

REFERENCES CITED

The following references are of record in the file of this patent:

UNITED STATES PATENTS

| Number | Name | Date |
|---|---|---|
| Re. 14,385 | Hazard | Oct. 30, 1917 |
| 1,278,531 | Wallbillich | Sept. 10, 1918 |
| 1,800,428 | Bebinger et al. | Apr. 14, 1931 |
| 1,828,905 | Mossay | Oct. 27, 1931 |
| 1,945,744 | Levin | Feb. 6, 1934 |
| 2,054,288 | Hastie | Sept. 15, 1936 |
| 2,059,205 | Buffington | Nov. 3, 1936 |
| 2,139,834 | Levin | Dec. 13, 1938 |
| 2,181,424 | Glacy et al. | Nov. 28, 1939 |
| 2,345,223 | Upp | Mar. 28, 1944 |
| 2,353,730 | Joy | July 18, 1944 |
| 2,399,460 | Britton | Apr. 30, 1946 |
| 2,409,765 | Kehle | Oct. 22, 1946 |
| 2,444,025 | Austin | June 29, 1948 |
| 2,483,650 | Lee | Oct. 4, 1949 |